United States Patent [19]
Satran et al.

[11] Patent Number: 5,921,723
[45] Date of Patent: Jul. 13, 1999

[54] CUTTING INSERT AND CUTTING TOOL ASSEMBLY

[75] Inventors: Amir Satran, Kfar Vradim; Rafael Margulis, Karmiel, both of Israel

[73] Assignee: Iscar Ltd., Migdal Tefen, Israel

[21] Appl. No.: 08/955,601

[22] Filed: Oct. 22, 1997

[30] Foreign Application Priority Data

Nov. 4, 1996 [IL] Israel ......................................... 119557

[51] Int. Cl.⁶ ..................................................... B23B 51/00
[52] U.S. Cl. ............................ 407/114; 407/115; 407/116
[58] Field of Search .................................... 407/114, 115, 407/116, 113, 34, 35, 43, 42, 40, 53

[56] References Cited

U.S. PATENT DOCUMENTS

| | | |
|---|---|---|
| 3,762,005 | 10/1973 | Erkfritz . |
| 4,789,273 | 12/1988 | Wiacek et al. ............................ 407/34 |
| 5,028,175 | 7/1991 | Pawlik .................................. 407/42 X |
| 5,330,295 | 7/1994 | Pawlik ..................................... 407/42 |

FOREIGN PATENT DOCUMENTS

| | | |
|---|---|---|
| 2156694 | 5/1996 | Canada . |
| 0 432 340 A1 | 6/1991 | European Pat. Off. . |
| 0196107 | 11/1984 | Japan ..................................... 407/114 |
| 60-221210 | 5/1985 | Japan . |

*Primary Examiner*—Andrea L. Pitts
*Assistant Examiner*—Henry W. H. Tsai
*Attorney, Agent, or Firm*—Pennie & Edmonds LLP

[57] ABSTRACT

A cutting insert has upper, lower and side surfaces and at least one cutting edge formed adjacent the insert lower surface and extending between two adjacent insert corners so as to, at least partially, protrude outwardly therefrom. The cutting edge lies in a plane which slopes upwardly from the insert lower surface at an exterior acute angle $\alpha$ and which intersects the insert lower surface at an intersection line passing through end points of the cutting edge associated with the insert corners.

15 Claims, 5 Drawing Sheets

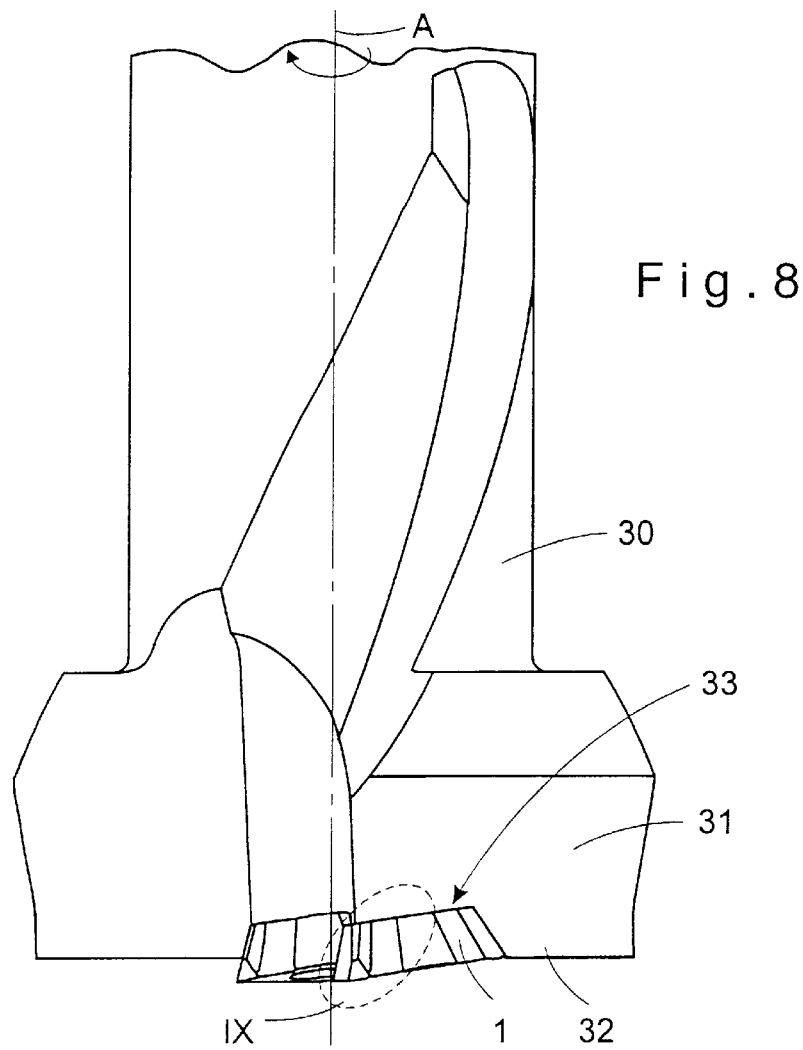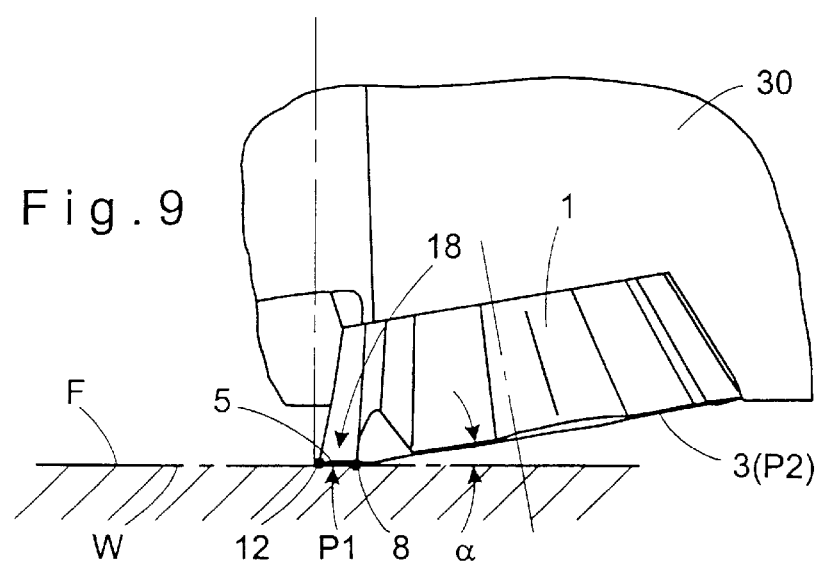

CUTTING INSERT AND CUTTING TOOL ASSEMBLY

FIELD OF THE INVENTION

The present invention refers to a cutting insert of the type adapted to be mounted at a front face of a rotary cutting tool for use in cutting operations where a main feed direction of the cutting tool is along the rotary axis thereof such as, for example, in drilling, plunger end milling, trepanning or the like.

BACKGROUND OF THE INVENTION

An example of a cutting insert of the above specified kind is a drilling insert of a trigon shape, each cutting edge of which extends between two adjacent insert corners and comprises two component cutting edges meeting at an intermediate corner which, as seen in the insert plan view, protrudes beyond an imaginary line connecting the adjacent insert corners.

When the cutting insert is mounted in a tool, the intermediate corner of its operative cutting edge protrudes in an axial direction of the tool, whereby it is ensured that, during cutting, the intermediate corner is the first to contact a workpiece being cut. This enables the intermediate corner to perform a so-called piloting function.

However, with the intermediate corner protruding in the axial direction, the planarity of a workpiece face surface being cut is very poor. This makes the inserts of the above design non-suitable for cutting operations where high degree of planarity of a workpiece face is required.

It is the object of the present invention to provide a new cutting insert which allows for a high planarity of a workpiece face surface machined thereby and provides for a 'piloting' effect.

SUMMARY OF THE INVENTION

In accordance with one aspect of the present invention there is provided a cutting insert having upper, lower and side surfaces and at least one cutting edge formed adjacent the insert lower surface and extending between two adjacent insert corners so as to, at least partially, protrude outwardly therefrom;

said cutting edge lying in a plane which slopes upwardly from said insert lower surface at an exterior acute angle $\alpha$ and which intersects said insert lower surface at an intersection line passing through end points of the cutting edge associated with said insert corners.

Preferably, said exterior acute angle $\alpha$ is in the range of 4° to 25°.

Preferably, said cutting edge comprises two component cutting edges extending from said end points of the cutting edge and meeting at an intermediate cutting corner protruding beyond said intersection line, the component cutting edges defining therebetween an obtuse angle.

Still more preferably, each component cutting edge comprises a leading cutting edge section adjacent said intermediate cutting corner and a trailing cutting edge section adjacent one of said insert corners, a trailing extremity of the leading cutting edge section and a leading extremity of the trailing cutting edge section merging via a bridging section.

Preferably, said trailing cutting edge sections of the component cutting edges extend substantially along said intersection line and said leading cutting edge sections of the component cutting edges protrude beyond said intersection line and define a protruding central leading portion of the cutting edge. The bridging sections of the two component cutting edges are, preferably, oriented so that the adjoining extremities of the leading and trailing cutting edge sections bridged thereby, overlap. By virtue of this design, each component cutting edge is discontinuous, whereby effective chip splitting is ensured during a cutting operation.

In the cutting insert according to the present invention, portions of the insert lower and side surfaces associated with the cutting edge of the insert generally constitute relief and rake surfaces thereof.

Preferably, the rake surface is provided with chip forming depressions formed adjacent the leading and trailing cutting edge sections and having dimensions, in the direction perpendicular to the cutting edge, which vary at different locations of the cutting edge.

Preferably, the relief surface comprises, adjacent said central leading portion of the cutting edge, a central relief surface recessed with respect to said plane, a substantial portion of the central relief surface being substantially parallel to said insert tower surface.

Preferably, at least one corner of the insert is formed with a planar chamfer disposed adjacent an associated end point of the cutting edge and oriented so as to provide, during a cutting operation, an auxiliary cutting edge adapted to burnish a side wall of a workpiece being cut.

Preferably, the insert is indexable about its axis of rotational symmetry. Preferably, each cutting edge is symmetrical with respect to a radial plane of symmetry passing through said intermediate cutting corner and said axis of rotational symmetry.

In accordance with another aspect of the present invention, there is provided a cutting tool assembly comprising
- a tool holder having a longitudinal axis of rotation and having a head portion formed, at a front face thereof, with at least one insert receiving seat;
- at least one cutting insert having upper, lower and side surfaces and at least one cutting edge formed adjacent the insert lower surface and extending between two adjacent insert corners so as to, at least partially, protrude outwardly therefrom;
- said cutting edge lying in a plane which slopes upwardly from said insert lower surface at an exterior acute angle $\alpha$ and which intersects said insert lower surface at an intersection line passing through end points of the cutting edge associated with said insert corners;
- said cutting insert being mounted in said insert receiving seat so that said insert lower surface is inclined with respect to a plane perpendicular to said longitudinal axis at an angle equal to said acute angle $\alpha$ and so that said cutting edge of the insert is oriented generally radially with respect to the longitudinal axis of the tool holder.

Thus, the exterior acute angle $\alpha$ is chosen so as to equal to a required relief angle which, during cutting operation, should be obtained between the insert lower surface and a workpiece being cut.

With the cutting insert designed according to the present invention, being mounted in the tool holder in the above specific manner, the insert cutting edge is provided with all appropriate reliefs and its entire cutting edge lies in a plane parallel to the workpiece face surface, whereby a high planarity of the latter can be achieved. In addition, notwithstanding the planar geometry of the cutting edge, it can still carry out its piloting function since the intermediate cutting corner thereof is disposed ahead of the remainder of the cutting edge.

BRIEF DESCRIPTION OF THE DRAWINGS

For a better understanding of the present invention and to show, by way of example only, how the same may be carried out in practice reference will now be made to the accompanying drawings, in which

FIG. 8 is a side view of a cutting tool assembly according to the present invention, where the cutting insert shown in FIGS. 1 to 7 is employed; and FIG. 9 is a detail IX on an enlarged scale, of the cutting tool assembly shown in FIG. 9.

DETAILED DESCRIPTION OF THE PREFERRED EMBODIMENTS

Figure 1:
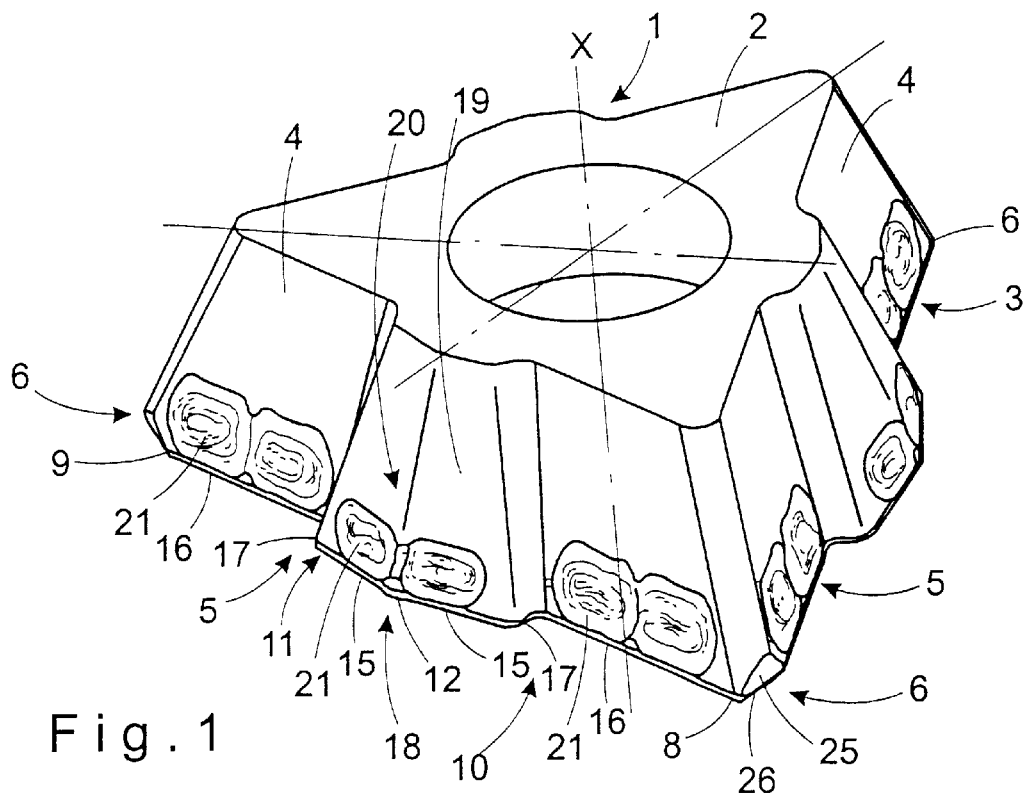
FIGS. 1 and 2 are respectively top and bottom isometric views of a cutting insert according to the present invention.

FIGS. 1 to 7 show a cutting insert 1 according to the present invention. The cutting insert 1 is of a general trigon shape and has parallel upper and lower surfaces 2 and 3, side surfaces 4 extending inwardly from the lower surface 3 to the upper surface 2 and three cutting edges 5 formed adjacent the insert lower surface 3. The cutting edges 5 are indexable about an axis X of rotational symmetry of the cutting insert 1.

Figure 5:
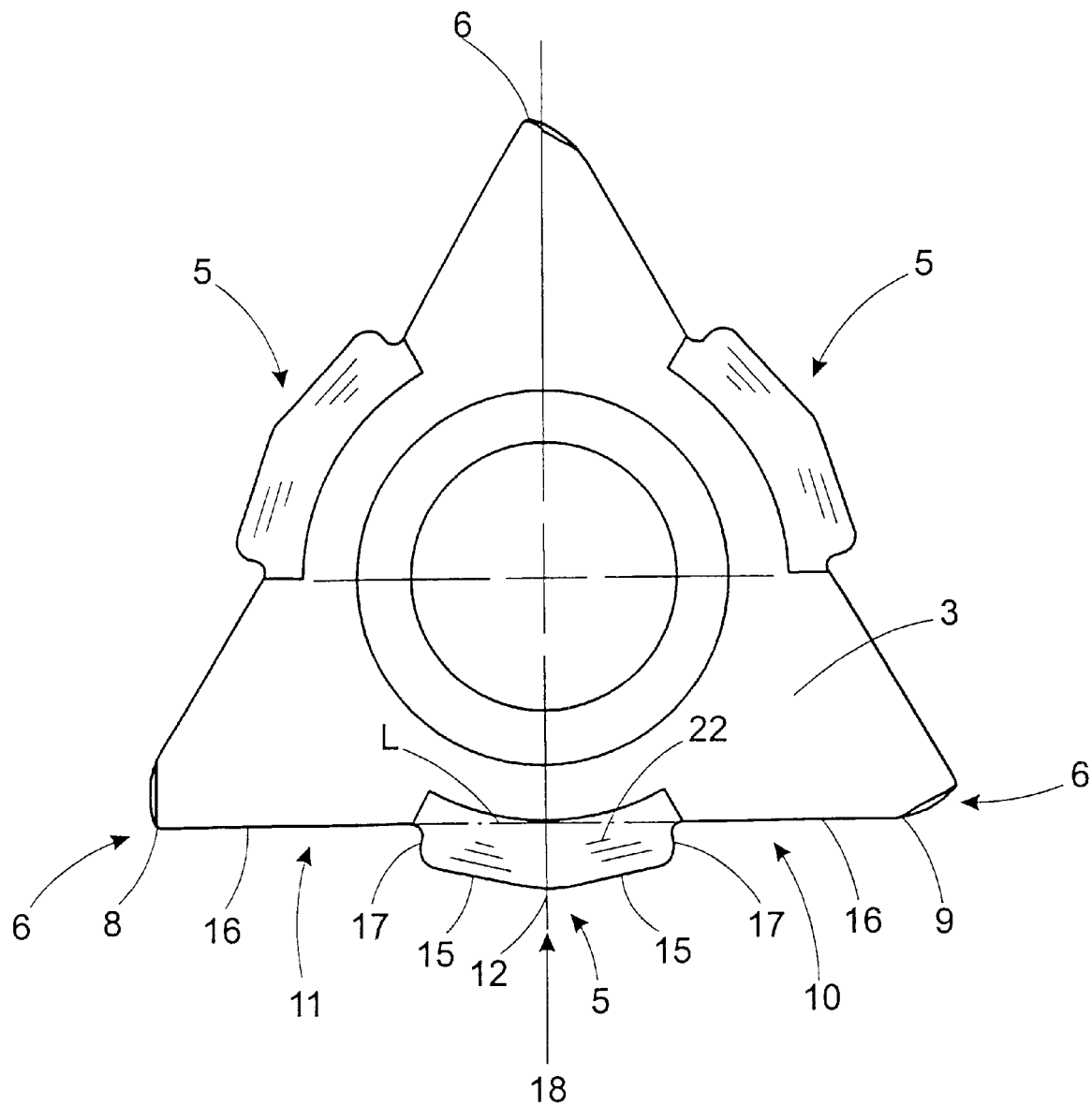
FIG. 5 is a bottom view of the cutting insert shown in FIGS. 1 and 2.
Figure 6:
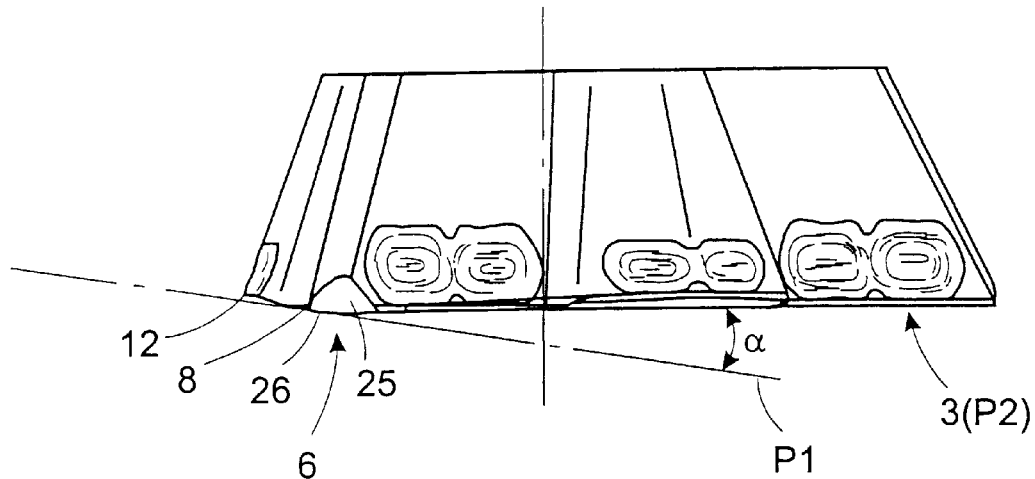
FIG. 6 is a side view in the direction VI of the cutting insert shown in FIG. 4.

Each cutting edge 5 extends between adjacent insert corners 6, partially protruding outwardly therefrom, and lies in a plane P1 which slopes upwardly from a plane P2 of the insert lower surface 3 at an exterior acute angle α (shown in FIG. 6). The plane P1 intersects the plane P2 along an intersection line L (shown in FIGS. 4 and 5) passing through end points 8 and 9 of the cutting edge 5, associated with the insert corners 6. The angle α is preferably in the range of 4° to 25°. In the preferred embodiment, the angle α is 9°.

Each cutting edge 5 comprises two component cutting edges 10 and 11 extending from the respective end points 8 and 9 of the cutting edge 5 and meeting at an intermediate cutting corner 12 protruding beyond the intersection line L. The component cutting edges 10 and 11 are symmetrical with respect to a radial plane of symmetry passing through the intermediate cutting corner 12 and the axis X of rotational symmetry.

Figure 4:
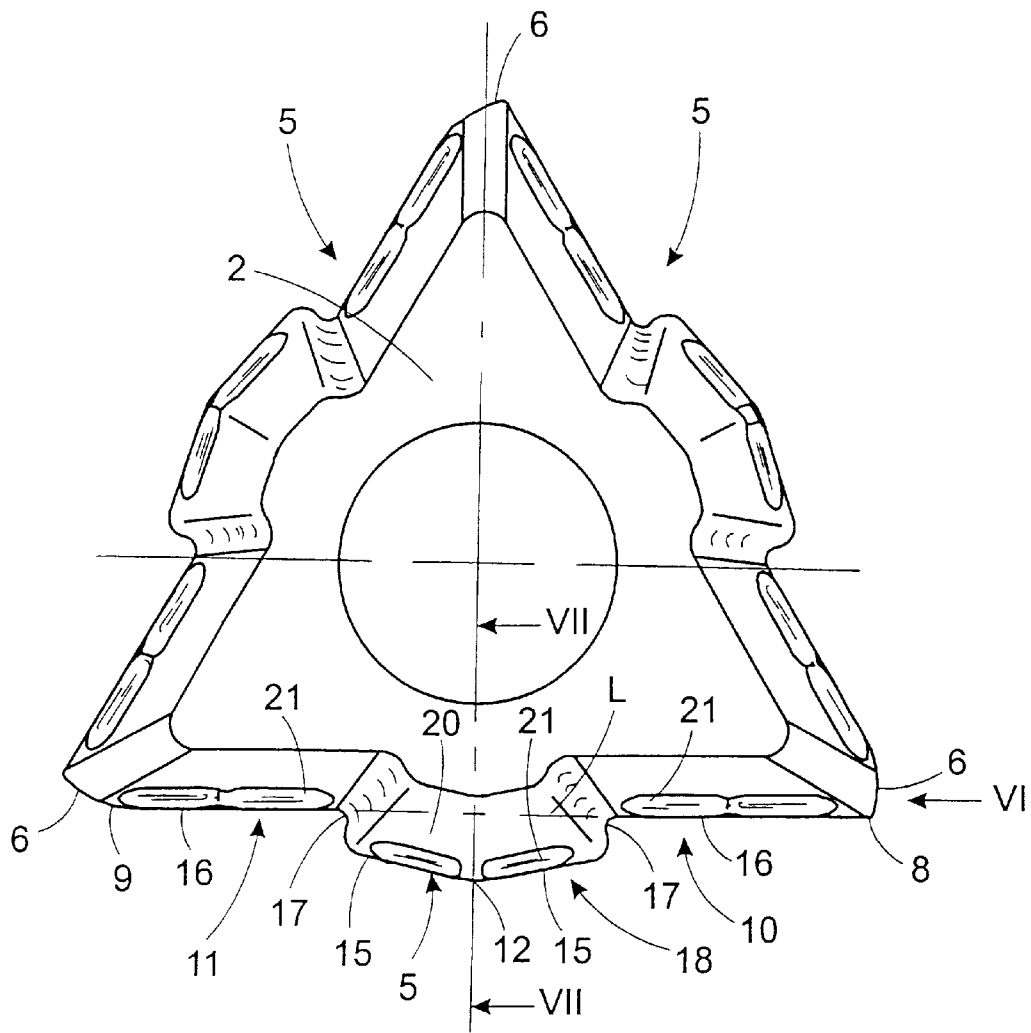
FIG. 4 is a top view of the cutting insert shown in FIGS. 1 and 2.

As shown in FIGS. 4 and 5, each component cutting edge 10, 11 consists of a leading cutting edge section 15 disposed adjacent the intermediate cutting corner 12 and a trailing cutting edge section 16 disposed adjacent a corresponding insert corner 6. A trailing extremity of the leading cutting edge section 15 and a leading extremity of the trailing cutting edge section 16 merge via a bridging section 17. In the preferred embodiment, the bridging portion 17 lies generally in the plane P1. The bridging sections 17 of the two component cutting edges 10 and 11 are oriented so that the adjoining extremities of the leading and trailing cutting edge sections 15 and 16 overlap.

Figure 2:
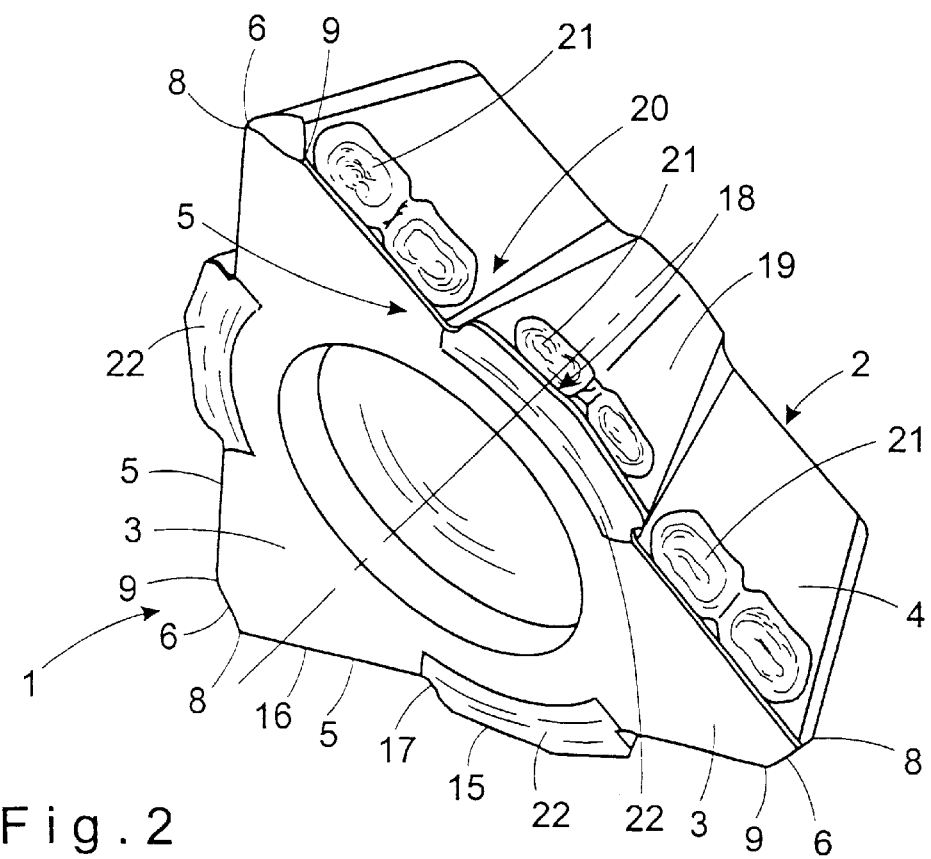

As seen in FIGS. 1, 4 and 5, the trailing cutting edge sections 16 of the component cutting edges 10 and 11 substantially coincide with the intersection line L while the leading cutting edge sections 15 of the component cutting edges 10 and 11 protrude beyond the intersection line L and are oriented so as to form therebetween an obtuse angle. The leading cutting edge sections 15 define a protruding central leading portion 18 of the cutting edge. As seen in FIGS. 1 and 2, a portion 19 of the side surface 4 associated with the central leading portion 18 of the cutting edge 5 protrudes outwardly with respect to adjacent portions of the side surface 4.

Figure 3:
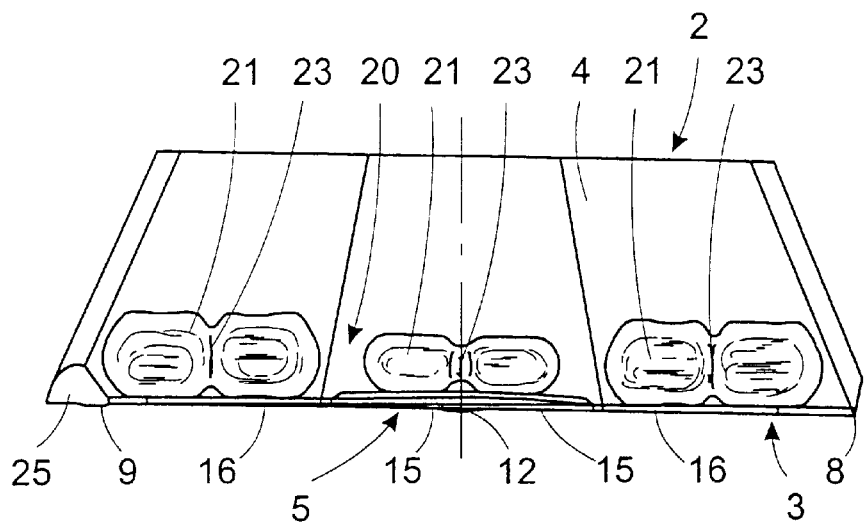
FIG. 3 is a side view of the cutting insert shown in FIGS. 1 and 2.

As seen in FIGS. 1 to 4, the cutting insert 1 has a rake surface 20 constituted by a portion of the insert side surface 4 adjacent the cutting edge 5. The rake surface 20 is formed with oblong chip forming depressions 21 having dimensions, in the direction perpendicular to the cutting edge 5, which vary at different locations of the cutting edge 5. Thus, as seen in FIG. 3, the dimension of the chip forming depressions 21 adjacent the trailing cutting edge sections 16 of the component cutting edges 10 and 11 is greater than that adjacent the leading cutting edge sections 15 thereof. Preferably, the chip forming depressions 21 are sub-divided into two parts by a central, relatively narrow chip deforming rib 23 (FIG. 3).

Figure 7:
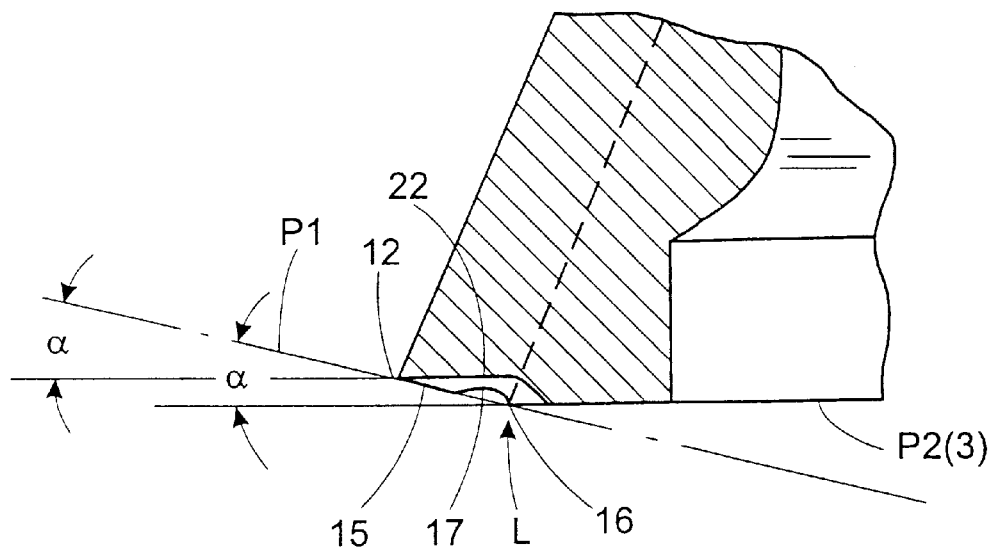
FIG. 7 is a cross-sectional view, on an enlarged scale, along the line VII—VII of the cutting insert shown in FIG. 4.

As seen in FIGS. 2 and 5, the protruding central leading portion 18 of the cutting edge 5 is provided with a central relief surface 22 recessed relative to the plane P1 and extending into plane P2 across the intersection line L. As seen in FIG. 7, the recessed central relief surface 22 forms with the plane P1 an angle equal to the angle α, i.e. it is parallel to the plane P2 of the insert lower surface 3.

As seen in FIGS. 1, 3 and 6, there is formed, at each insert corner 6, a planar chamfer 25 oriented so as to provide, during a cutting operation where the insert is disposed with this cutting corner being radially outermost, an auxiliary cutting edge 26 adapted to burnish a cylindrical side wall of a workpiece being cut.

The use of the insert 1 described above in a cutting tool assembly is illustrated in FIGS. 8 and 9. The cutting tool assembly, as seen in FIG. 8, comprises a tool holder 30 which has a longitudinal axis of rotation A perpendicular to a face F of a workpiece W and which has a head portion 31 with a front face 32 formed with at least one insert receiving seat 33.

The cutting insert 1 is mounted in the insert receiving seat 33 in a so-called tangential or "on-edge" manner and so that its cutting edge 5 is directed generally radially with respect to the longitudinal axis A of tool holder 30 and the plane P2 of the insert lower surface 3 is inclined with respect to a plane perpendicular to the longitudinal axis A of the tool holder at an acute angle equal to the angle α. Thereby, it is ensured that the plane P1 in which the entire cutting edge 5 is disposed, is perpendicular to the longitudinal axis A of the tool holder 30 and, consequently, to the axial feed direction of the tool. Consequently, as seen in FIG. 9, during a cutting operation, the cutting edge 5 lies in a plane of the workpiece face surface F, whereby a high planarity of the latter can be achieved. At the same time, the lower surface 3 and the recessed central relief surface 22 are inclined to the plane perpendicular to the longitudinal axis of the tool holder, whereby the reliefs required for effective cutting are provided. Actually, the exterior acute angle α of the cutting insert is chosen so as to equal to a required relief angle which, during cutting operation, should be obtained between the insert lower surface and the workpiece being cut.

It should be noted that the cutting insert according to the present invention may have alternative embodiments different from that described in the specification and shown in the drawings. Thus, for example, the insert may be of a shape other than the trigon shape and may have less or more than three indexable cutting edges. The cutting edge of the insert may be asymmetrical and its component cutting edges may be continuous. The cutting edge sections may be curved rather straight. The bridging section of each component cutting edge may be planar and lie in the plane P1 or in the recessed relief surface 22 of the central leading portion of the cutting edge or rather it may be in the form of a space curve disposed between the leading and trailing cutting edge sections of the component cutting edges.

We claim:

1. A cutting insert having upper, lower and side surfaces and at least one cutting edge formed adjacent the insert lower surface and extending between two adjacent insert corners so as to, at least partially, protrude outwardly from said adjacent insert corners;

said cutting edge lying in a plane which slopes upwardly from said insert lower surface at an exterior acute angle α and which intersects said insert lower surface at an intersection line passing through end points of the cutting edge associated with said insert corners.

2. A cutting insert according to claim 1, wherein said exterior acute angle α is in the range of 4° to 25°.

3. A cutting insert according to claim 1, wherein said cutting edge comprises two component cutting edges extending from said end points of the cutting edge and meeting at an intermediate cutting corner protruding beyond said intersection line, the component cutting edges meeting at an obtuse angle.

4. A cutting insert according to claim 3, wherein each component cutting edge comprises a leading cutting edge section adjacent said intermediate cutting corner and a trailing cutting edge section adjacent one of said insert corners, a trailing extremity of the leading cutting edge section and a leading extremity of the trailing cutting edge section merging via a bridging section.

5. A cutting insert according to claim 4, wherein said trailing cutting edge sections of the component cutting edges extend substantially along said intersection line and said leading cutting edge sections of the component cutting edges protrude beyond said intersection line and define a protruding central leading portion of the cutting edge.

6. A cutting insert according to claim 4, wherein said bridging sections of the two component cutting edges are oriented so that the adjoining extremities of the leading and trailing cutting edge sections bridged thereby, overlap.

7. A cutting insert according to claim 1, wherein a rake surface of the insert which is constituted by the side surface associated with the cutting edge of the insert, is provided with chip forming depressions formed adjacent the leading and trailing cutting edge sections.

8. A cutting insert according to claim 7, wherein said chip forming depressions have dimensions, in the direction perpendicular to the cutting edge, which vary at different locations of the cutting edge.

9. A cutting insert according to claim 1, wherein said central leading portion of the cutting edge is provided with a central relief surface recessed with respect to said plane.

10. A cutting insert according to claim 9, wherein a substantial portion of said central relief surface is substantially parallel to said insert lower surface.

11. A cutting insert according to claim 1, wherein at least one corner of the insert is formed with a planar chamfer disposed adjacent an associated end point of the cutting edge and oriented so as to provide, during a cutting operation, an auxiliary cutting edge adapted to burnish a side wall of a workpiece being cut.

12. A cutting insert according to claim 1, wherein the insert is indexable about an axis of rotational symmetry.

13. A cutting insert according to claim 12, wherein each cutting edge is symmetrical with respect to a radial plane of symmetry passing through an intermediate cutting corner and said axis of rotational symmetry.

14. A cutting tool assembly comprising:

a tool holder having a longitudinal axis of rotation and having a head portion formed, at a front face thereof, with at least one insert receiving seat;

at least one cutting insert mounted in said insert receiving seat, said insert having upper, lower and side surfaces and at least one cutting edge formed adjacent the insert lower surface and extending between two adjacent insert corners so as to, at least partially, protrude outwardly from said adjacent insert corners;

said cutting edge lying in a plane which slopes upwardly from said insert lower surface at an exterior acute angle α and which intersects said insert lower surface at an intersection line passing through end points of the cutting edge associated with said insert corners;

the cutting insert being mounted in the insert receiving seat so that said insert lower surface is inclined with respect to a plane perpendicular to said longitudinal axis at an angle equal to said acute angle α and so that the cutting edge of the insert is oriented generally radially with respect to the longitudinal axis of the tool holder.

15. A cutting tool assembly according to claim 14, wherein said exterior acute angle α is chosen so as to equal to a required relief angle which, during cutting operation, should be obtained between the insert lower surface and a workpiece being cut.

\* \* \* \* \*